Patented Oct. 28, 1952

2,615,827

UNITED STATES PATENT OFFICE 2,615,827

FUNGICIDAL AND INSECTICIDAL PREPARATIONS

Albert J. Shmidl, Greens Bayou, Tex., assignor, by mesne assignments, to Standard Oil Development Company, Elizabeth, N. J., a corporation of Delaware No Drawing. Application January 3, 1950,
Serial No. 136,643

5 Claims. (Cl. 167—30)

The present invention is directed to an improved insecticide and fungicide. More particularly, the invention is directed to a fungicide and insecticide which contains a halogen.

Prior to the present invention it has been known to employ halogenated hydrocarbons as fungicides and insecticides. Typical of the prior art is Reissue 22,597 to Ladd, 2,286,222 to Moyle and Fletcher and 2,362,563 and 2,362,565 also to Ladd. These patents teach various chlorinated hydrocarbon derivatives as insecticides and parasiticides and have the common property of the carbon atoms in the ring being halogenated. While halogenation of the carbon atoms in the ring increases the toxicity to insects and parasites and fungi, it also increases the toxicity to higher animal life such as the vertebrate and mammalian forms.

It is therefore the main object of the present invention to provide an improved insecticide and fungicide which may be safely used in contact with higher animal life.

Another object of the present invention is to provide a novel and useful halogenated hydrocarbon adapted to be used as an insecticide and fungicide.

A still further object of the present invention is to provide improved compositions suitable for use in combating insect and low forms of animal life.

A still further object of the present invention is to provide insecticidal and fungicidal compositions containing a halogenated hydrocarbon wherein the halogen is substituted on non-aromatic carbon atoms.

In accordance with the present invention an improved insecticide and fungicide is provided which has a controlled degree of halogen content. Furthermore the improved fungicide and insecticide of the present invention contains halogen in the compound such that it is on the non-aromatic carbon atoms in the compound.

In accordance with the present invention an improved insecticide and fungicide is provided comprising a halogenated duroquinone containing an average of more than 50% by weight of halogen substituted on the non-aromatic carbon atoms. By halogenating the carbon atoms other than the aromatic carbon atoms in accordance with the present invention, it is believed that the alkyl constituents of the duroquinone in themselves play a part in the toxicity of the compound to lower animal life, whereas higher animal life such as represented by the vertebrate and mammalian forms may not be harmed.

It is contemplated that the halogenated duroquinone containing an average of more than 50% by weight of halogen may be used as such as a fungicide and parasiticidal material or it may be used in suitable dispersion materials. For example, it may be used in the powder form as such and dusted on the surfaces where the insects and fungi may be encountered or it may be dispersed in finely divided materials such as talc, clay, chalk and the like and dusted on the infested areas. For example, it may be desired to dust animal life which has been infested with insects with a composition comprising halogenated duroquinone containing an average of more than 50% by weight of halogen substituted on the non-aromatic carbon atoms.

The improved insecticide and fungicide may also be used in fluid suspensions. For example, the halogenated duroquinone having the properties listed above may be dissolved in a hydrocarbon having solvent properties for the halogenated duroquinone. Such solvents include white oil having a 90 SSU viscosity at 100° F. and other hydrocarbons as exemplified by light naphthas boiling as low as 150° F., aromatic concentrates boiling no higher than about 285° F., low aromatic content kerosenes boiling up to 425° F., and the like, including components thereof such as benzene, toluene, and the xylenes.

The halogenated duroquinone dissolved in a suitable solvent of the type mentioned before may then be dispersed in water. When dispersing the halogenated duroquinone in water a wetting agent such as alkyl aryl sulfonate of an aromatic sulfonic acid, an alkali metal salt of a petroleum salt sulfonic acid and other dispersing agents such as exemplified by sulfonated lauryl alcohol, Turkey red oil and fish oil soaps, may be used.

The duroquinone, employed to prepare the halogenated derivative of the present invention, may suitably be prepared by the methods described in "Organic Synthesis," vol. 10, H. T. Clark, Editor in Chief, John Wiley & Sons, Inc., New York, 1940, pages 40–42 inclusive. Durene derived from petroleum may be converted into duroquinone by careful nitration as outlined in the foregoing reference to produce a dinitrate derivative. The nitration may be accomplished by the action of the theoretical quantity of concentrated nitric acid in the presence of concentrated sulfuric acid. The dinitrate derivative produced in this manner is then reduced to the amine. This reduction may be accomplished by the action of an acid on a metal such as iron or tin in the presence of the aromatic nitrate. The reaction must be carried to the point where both nitrate groups have been reduced to the corresponding amine. The amine is separated by distillation or by forming a complex or salt such as the tin salt. The preferred method for separation on a small scale is to separate the amine as the tin salt and subsequently decompose and oxidize this tin salt with ferric chloride in concentrated hydrochloric acid to produce duroquinone.

This halogenation may readily be accomplished by contacting the duroquinone in the presence of light and/or a halogen carrier. This method of halogenation is well known, and it is simple to control the halogenation to any desired degree such that it will contain an average of more than 50% by weight of halogen substituted on the non-aromatic carbon atoms.

While any halogen such as bromine, iodine or chlorine may be employed, it is preferred to employ chlorine as the halogenating agent. Bromine may be substituted for the chlorine and iodine may be employed, but it would be less desirable to use it for economical reasons than the other two.

The conditions employed in the halogenation may be used to produce halogenated duroquinone having an average of more than 50% by weight of halogen substituted on the non-aromatic carbon atom. A large number of compounds may thus be produced satisfying this requirement. For instance, there are three hydrogens on each of the four methyl groups in duroquinone which are susceptible to replacement by halogen. It will be seen that one hydrogen on each carbon atom may be substituted or more than one may be substituted or two or more hydrogens may be substituted on one of the methyl groups while other of the methyl groups may not be substituted at all. The essential requirement of the present invention is that the halogenated duroquinone contain on an average of more than 50% by weight of halogen substituted on the non-aromatic carbon atoms. By virtue of the halogen being substituted on the non-aromatic carbon atoms the degree of toxicity is not increased to an extent where the compound would be dangerous to higher forms of animal life such as represented by the vertebrate and mammalian forms. Thus the improved insecticide and fungicide may be used on animals and in ridding crops of destructive fungi.

In order to illustrate the invention further, chloroduroquinone was prepared which contained approximately 54.5% by weight of chlorine. This compound was formed into a suspension and was tested to determine its fungicidal properties to *Alternaria solani* and *Sclerotinia fructiola*. These fungi are the cause of early blight on potatoes and tomatoes and the appearance of brown rot on peaches, respectively. The test method employed has been described by Horsfall, "Fungicides and Their Action," The Chronica Botanica Co., Waltham, Massachusetts, 1945, in which the amount of fungicides necessary to obtain 50% morality is determined.

In the particular technique employed, a culture of the common test organisms was maintained in the laboratory under sterile conditions. The slide germination method, which is widely used in botanical investigations, was employed as the test method. In this technique fungus spores obtained under controlled conditions as regards species, strains, medium, age, temperature and concentration and stimulant, if desired, are suspended in distilled water. Aliquots of this suspension are pipetted into dilutions or suspensions of the chemical to be tested. Droplets of the resulting mixture are pipetted onto 1 by 3 inch glass slides. These are placed in moist chambers which are sealed with water and held at a temperature suitable for germination. After 20 hours the slides are removed from the moist chambers and the droplets examined under a low power microscope. The percentage spores inhibited from germinating, based on one hundred spores counted from each drop, are recorded. Ordinarily, in testing a single compound, it is usually desirable to make several thousand spore counts.

It was found on testing fungicidal properties of the present invention that a solution in the range of 0.001 to 0.0001 weight per cent of the chlorinated duroquinone containing 54.5% by weight of chlorine allowed only 50% germination to *Alternaria solani*. A similar test was carried out on *Sclerotinia fructiola*. These results show that the chlorinated duroquinone of the present invention has improved fungicidal properties.

The improved fungicide and insecticide of the present invention was then tested on milk weed bug by immersing a specimen of the bug for two minutes in a 0.25 weight per cent suspension of the improved fungicide and insecticide. A mortality to the milk weed bug of 100% was obtained.

Similar tests with a suspension of the same concentration were performed on specimen of the German roach. In this test a morality of 30% was obtained.

The toxicity of the present invention was then tested on the American roach by injecting into the blood stream of male and female specimens 0.5 milligram of the compound per gram of body weight. This blood stream injection resulted in a mortality of 100% in both instances.

A suspension of the chlorinated duroquinone mentioned before having a chlorine content of approximately 54.5% by weight was employed in the house fly. The Nelson drop test showed 95% mortality. The Nelson drop test is carried out by placing a measured droplet of a suspension or solution of the chemical of the present invention onto the ventral surface of the insect's thorax. The treated insects are kept in holding cages for four days and counts are made daily. The number of insects killed is employed in computing the efficacy of the test. From these data it may be concluded that a suspension of the improved fungicide and insecticide of the present invention may be employed to rid infested areas of house flies.

The toxicity of the compounds of the present invention was also tested on coleus to determine whether or not there was danger of plant life being harmed when used to combat fungi on vegetation. In every instance it was found that coleus suffered no injury when subjected to the improved fungicide and insecticide of the present invention.

It is indeed unusual that the chlorinated duroquinone containing 54.5% approximately of chlorine should be so effective against milk weed bug, the female and male American roach, the house fly and against the two aforementioned fungi since an allied compound, tetrachlorobenzoquinone, did not show anywhere near the effectiveness when tested against the German roach or milk weed bug or American female and male roach. Not only is the tetrachlorobenzoquinone less effective than the chlorinated duroquinone, but duroquinone itself is not as effective as the chloroduroquinone. For example, the milk weed bug, where 100% mortality was obtained with chloroduroquinone, only 15% mortality was effected with duroquinone. Likewise, where 100% mortality was obtained with chloroduroquinone against the female and male roach, only 80% mortality was effected with duroquinone. It will be seen then that substituents on the methyl carbon atoms effect a marked superiority in toxicity to lower forms of animal life.

The reason why the halogenated duroquinone of the present invention is markedly superior to both tetrachlorobenzoquinone and duroquinone is not understood but it is postulated that the methyl groups with substituted halogens thereon contribute to the activational effect conferred by the halogen to the compounds of the present invention. It is to be understood, however, that I do not bind myself by this postulate which is offered by way of explanation and not by way of limitation.

The nature and objects of the present invention having been completely described and illustrated, what I wish to claim as new and useful and to secure by Letters Patent is:

1. A fungicide and insecticide which comprises a chlorinated duroquinone containing approximately 54.5% by weight of chlorine substituted on the non-aromatic carbon atoms, a hydrocarbon, a wetting agent, and water.

2. A fungicide in accordance with claim 1 in which the hydrocarbon boils below 425° F.

3. A fungicide and insecticide which comprises a chlorinated duroquinone containing approximately 54.5% by weight of chlorine substituted on the non-aromatic carbon atoms and a finely divided solid dispersing agent.

4. A fungicide and insecticide which comprises a chlorinated duroquinone containing approximately 54.5% by weight of chlorine substituted on the non-aromatic carbon atoms dissolved in a hydrocarbon in the amount and range between 1 and 10% by weight, said solution being dispersed in water containing a wetting agent in an amount in the range between 0.1 and 1% by weight of the water.

5. A fungicide and insecticide which comprises a chlorinated duroquinone containing approximately 54.5% by weight of chlorine substituted on the non-aromatic carbon atoms and a dispersing agent for the chlorinated duroquinone.

ALBERT J. SHMIDL.

REFERENCES CITED

The following references are of record in the file of this patent:

UNITED STATES PATENTS

| Number | Name | Date |
|---|---|---|
| 1,752,293 | Brodersen et al. | Apr. 1, 1930 |
| 2,349,771 | Ter Horst | May 23, 1944 |
| 2,362,563 | Ladd | Nov. 14, 1944 |
| 2,362,564 | Ladd | Nov. 14, 1944 |
| 2,362,565 | Ladd | Nov. 14, 1944 |
| 2,362,594 | Ter Horst | Nov. 14, 1944 |
| 2,368,667 | Ladd | Feb. 6, 1945 |

OTHER REFERENCES

Euler et al. Chemical Abstracts, volume 39, pages 3786, 3787 (1945).